US009946431B2

United States Patent
Park-Ekecs et al.

(10) Patent No.: US 9,946,431 B2
(45) Date of Patent: Apr. 17, 2018

(54) RESIZABLE AND LOCKABLE USER INTERFACES

(71) Applicant: DISNEY ENTERPRISES, INC., Burbank, CA (US)

(72) Inventors: Sylvia Park-Ekecs, Newbury Park, CA (US); Richard Cardran, Los Angeles, CA (US); Keith Tralins, Sherman Oaks, CA (US); Arnaud Robert, Simi Valley, CA (US)

(73) Assignee: Disney Enterprises, Inc., Burbank, CA (US)

(*) Notice: Subject to any disclaimer, the term of this patent is extended or adjusted under 35 U.S.C. 154(b) by 748 days.

(21) Appl. No.: 14/023,436

(22) Filed: Sep. 10, 2013

(65) Prior Publication Data

US 2014/0215388 A1    Jul. 31, 2014

Related U.S. Application Data

(60) Provisional application No. 61/759,383, filed on Jan. 31, 2013.

(51) Int. Cl.
  *G06F 3/048* (2013.01)
  *G06F 3/0481* (2013.01)
  *G06F 3/0484* (2013.01)

(52) U.S. Cl.
  CPC ........ *G06F 3/0481* (2013.01); *G06F 3/04845* (2013.01); *G06F 3/04847* (2013.01)

(58) Field of Classification Search
  CPC . G06F 3/0481; G06F 3/04845; G06F 3/04847
  USPC .............................................. 715/800; 1/800
  See application file for complete search history.

(56) References Cited

U.S. PATENT DOCUMENTS

| | | | | |
|---|---|---|---|---|
| 5,659,693 A | * | 8/1997 | Hansen et al. | 715/779 |
| 5,712,995 A | * | 1/1998 | Cohn | 715/792 |
| 5,874,958 A | * | 2/1999 | Ludolph | G06F 9/4443 715/781 |
| 6,008,809 A | * | 12/1999 | Brooks | 715/792 |
| 6,031,529 A | * | 2/2000 | Migos | G06F 3/0481 715/783 |
| 6,195,094 B1 | * | 2/2001 | Celebiler | G06F 3/0481 715/764 |
| 7,036,089 B2 | * | 4/2006 | Bauer | 715/827 |
| 8,671,344 B2 | * | 3/2014 | Icho | G06F 3/0485 715/702 |
| 9,026,935 B1 | * | 5/2015 | Rasmussen | H04L 51/04 715/764 |
| 2005/0050462 A1 | * | 3/2005 | Whittle et al. | 715/517 |
| 2007/0271532 A1 | | 11/2007 | Nguyen et al. | |
| 2008/0291174 A1 | * | 11/2008 | Mazeev | G06F 3/023 345/173 |
| 2009/0064055 A1 | * | 3/2009 | Chaudhri | G06F 3/04817 715/863 |

(Continued)

*Primary Examiner* — William Bashore
*Assistant Examiner* — Gregory A Distefano
(74) *Attorney, Agent, or Firm* — Sheppard Mullin Richter & Hampton

(57) ABSTRACT

Resizable and lockable user interfaces (UI) are provided. Systems and methods described herein allow a user to resize and/or lock a section of the user interface. Interference and distraction caused by secondary content when primary content is traversed may be minimized. In addition, UI controls are provided to allow traversing primary content and secondary content separately.

18 Claims, 4 Drawing Sheets

(56) References Cited

U.S. PATENT DOCUMENTS

| | | | |
|---|---|---|---|
| 2009/0293007 A1* | 11/2009 | Duarte | G06F 3/0481 |
| | | | 715/767 |
| 2010/0115051 A1 | 5/2010 | Robert et al. | |
| 2010/0138767 A1* | 6/2010 | Wang | G06F 3/0481 |
| | | | 715/769 |
| 2010/0229090 A1* | 9/2010 | Newton | G06F 3/0428 |
| | | | 715/702 |
| 2010/0299587 A1* | 11/2010 | Swett | G06F 17/245 |
| | | | 715/227 |
| 2011/0078615 A1* | 3/2011 | Bier | 715/779 |
| 2011/0252363 A1* | 10/2011 | Tsuda | G06F 3/0483 |
| | | | 715/788 |
| 2012/0204125 A1* | 8/2012 | Shia | G06F 3/0488 |
| | | | 715/773 |
| 2013/0104054 A1* | 4/2013 | Cao | G06F 3/038 |
| | | | 715/753 |
| 2013/0215040 A1* | 8/2013 | Bose | G06F 3/0416 |
| | | | 345/173 |
| 2014/0095328 A1* | 4/2014 | Forouzandeh | G06Q 30/0277 |
| | | | 705/14.73 |

* cited by examiner

RESIZABLE AND LOCKABLE USER INTERFACES

CROSS-REFERENCE TO RELATED APPLICATIONS

This application claims the benefit of U.S. Provisional Application No. 61/759,383, filed on Jan. 31, 2013, which is hereby incorporated herein by reference in its entirety.

TECHNICAL FIELD

The present application relates generally to graphical user interfaces, and more particularly, some embodiments relate to resizable and lockable graphical user interfaces.

DESCRIPTION OF THE RELATED ART

Electronic visual displays are ubiquitous and affecting people's lives significantly. Via user interfaces, a user interacts with electronic visual displays to select information of interest to be displayed. Nevertheless, information of more than one content may be displayed in one browser window or one tap of a browser window. For example, primary content such as articles are usually accompanied by secondary content such as promotional materials. Secondary content shares, with the primary content, the limited space of a browser window. Secondary content may distract the user from the primary content and diminish the user's experience with the primary content.

BRIEF SUMMARY OF THE APPLICATION

Resizable and lockable user interfaces are provided. Systems and methods described herein provide a user with the option to resize and/or fix a section of the user interface. A user may minimize interference and distraction caused by secondary content when traversing primary content. Because the secondary content shares the display area with the primary content, the display area for the primary content is increased as a result of the section being resized. The section may be locked or fixed to a defined area. As such, primary content and secondary content may be navigated separately. In various embodiments, a resizable and lockable user interface (UI) comprises a first section and a second section. The first section is configured to display a first content and the second section is configured to display a second content. The secondary section may be resized in response to a user's input.

BRIEF DESCRIPTION OF THE FIGURES

The figures are provided for purposes of illustration only and merely depict typical or example embodiments. They do not limit the breadth, scope, or applicability of the invention.

DETAILED DESCRIPTION OF THE EMBODIMENTS OF THE DISCLOSURE

Primary content and second content are usually displayed to a user in one browser window or one tap of a browser window. Visual designs, rather than user interfaces (UIs), are usually relied on to differentiate primary content from secondary content. Nevertheless, when a user interacts with the primary content, it is inevitable that the secondary content may also be navigated. The primary content cannot be separated from the secondary content and the user's experience with the primary content is usually compromised.

Figure 1A:
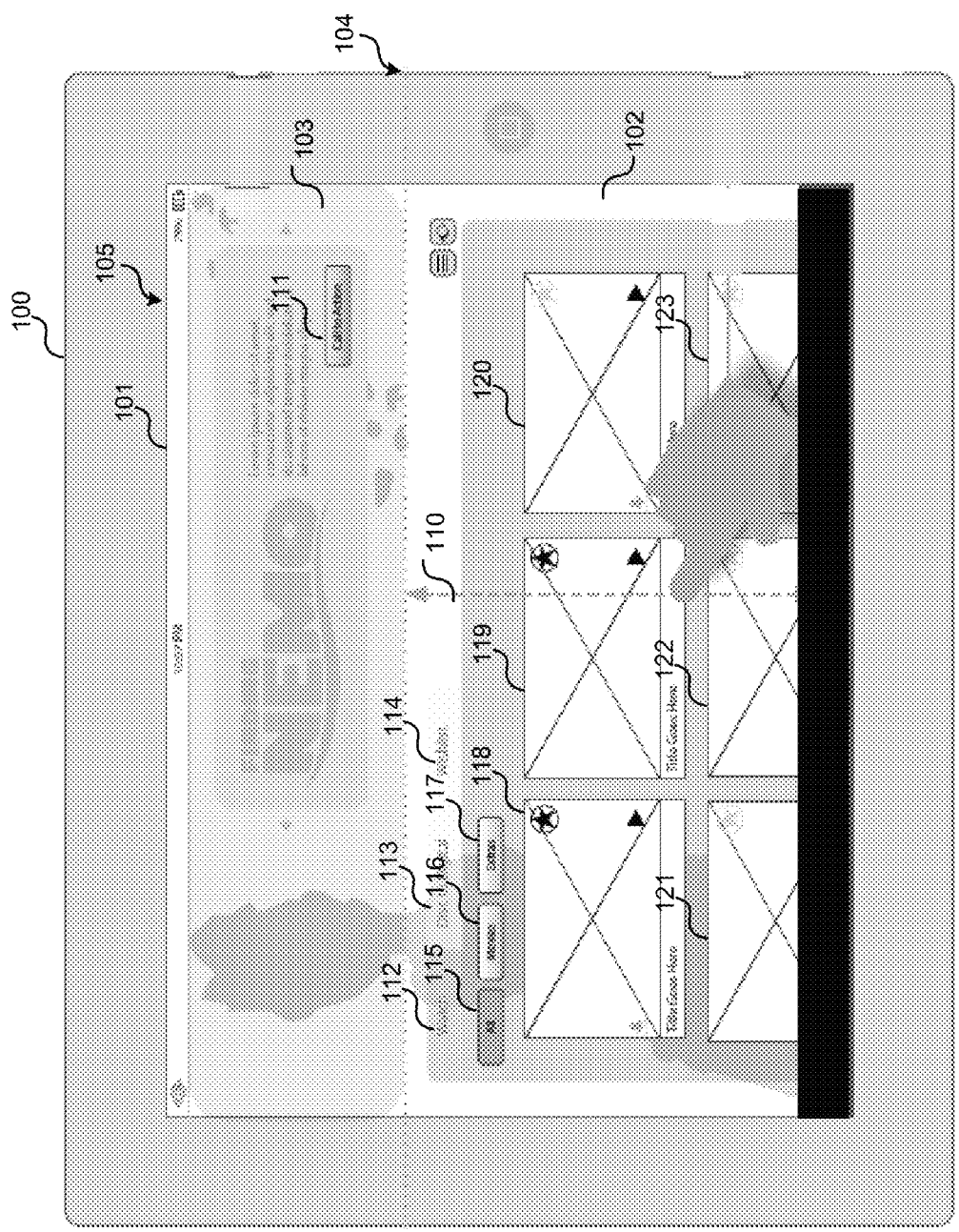
FIG. 1A is a diagram illustrating an example resizable and lockable user interface (UI) for accessing different content, where both sections are in their original sizes, in accordance with one embodiment of the systems and methods described herein.

FIG. 1A is a diagram illustrating an example resizable and lockable user interface (UI) 101 for accessing different content, where both sections 102-103 are in their original sizes, in accordance with one embodiment of the systems and methods described herein. In the illustrated example, the resizable and lockable UI 101 is displayed using an electronic display device 100. The example resizable and lockable UI 101 comprises a first section 102 and a second section 103. The first section 102 may be configured to display a first content, and the second section 103 may be configured to display a second content. The second content may be different from the first content. In the illustrated example, the primary content is poster art for different movies and the secondary content is a promotional banner.

The first section 102 and the second 103 share the display area of the visual display device 100. The resizable and lockable UI 101 comprises a set of UI controls 110-123. UI controls may include screen buttons of various shapes and appearances. Example UI controls 111-123 are buttons 111-123 that may be tapped or clicked by the user to access information of the primary or the secondary content. The UI control 110 is configured to track a motion of a user's finger(s), a stylus, or other similar objects. The motion may take place at different locations on the display screen of the visual display device 100. In the illustrated example, the motion is located in the middle of the screen of the visual display device 100. The UI control 110 may enable resizing and/or locking of the secondary section 103. A UI may include traditional navigation elements such as, for example scroll left/right, scroll up/down, back, zoom in/out, double click, multi-touch, and so on.

The UI control 110 allows a user to navigate, resize the second section 103, and/or lock the second section 103. In the illustrated example, the UI control 110 allows a user to slide up thereby bringing up both the primary content displayed in the first section 102 and the secondary content displayed in the second section 103. The user may resize the second section 103. For example, by performing a resizing gesture (e.g., a quick slide, a tap, or other triggering actions), the second section 103 may be resized. In some embodiments, a user may swipe in a direction (e.g., a horizontal direction, a vertical direction) to define the location for the boundary 104 between the first section 102 and the second section 103. In other embodiments, a user may actuate the UI control 110 by sliding up until the boundary 104 between the first section 102 and the second section 103 reaches the top edge 105 of the display area of the visual display device 100.

In the illustrated example, the second section 103 may be resized to an area defined by the top edge 105 of the display area of the visual display device 100 and the boundary 104 between the first section 102 and the second section 103. In various embodiments, the resized second section may be locked or fixed such that it is unresponsive to any input that is not a disabling or unlocking motion or gesture. In one embodiment, sliding anywhere on the display that lacks content (e.g., a background area) may unlock a second section that is fixed or locked. The first section as well as the displayed primary content may be adjusted in response to resizing of the second section 103.

In various embodiments, the secondary content to be displayed in the second section 103 is adjusted according to the size of the second section 103. In various embodiments, second content may be prioritized. Where the display area is limited, the content with a higher priority rather than the content with a lower priority may be displayed. In other words, the lower priority content is not displayed unless the display area is sufficient for displaying such content. In one example, the movie title of a movie being promoted has the highest priority and may be displayed instead of other promotional materials when the second section 103 is resized.

In various embodiments, a user's input may define the first section 102 and the second section 103 of a UI 101. For example, a user may draw a line such as the boundary 104 to divide the UI 101 into two sections. Subsequently, the user may define the first section 102 to display primary content and the second section 103 to display secondary content. In one embodiment, a user input defines the first and second sections only if a display area is defined. In the illustrated example, the display area is the entire screen space of the visual display 100. In some embodiments, a user may define an area of the screen space to be a display area. The predefined display area may be provided by non-user entities, for example, the developers of the application.

The resizing and/or locking of the second section 103 may be temporary. That is, a user may disable resizing and/or locking of the second section 103 and restore the second section 103 to its original size. The UI 101 is displayed according to its original design. By performing an unlocking gesture (e.g., a quick slide, a tap, or other triggering actions), a user may choose to restore the second section 103 to its original size. Upon receiving the disabling and/or unlocking input from the user, the second section 103 is no longer resized. After disabling resizing of the second section 103, the user may then navigate the content of both the primary and secondary sections 102-103. The first section 102 may be readjusted after disabling the resizing of the second section 103 in order to recover the UI 101 to its original design.

Figure 1B:
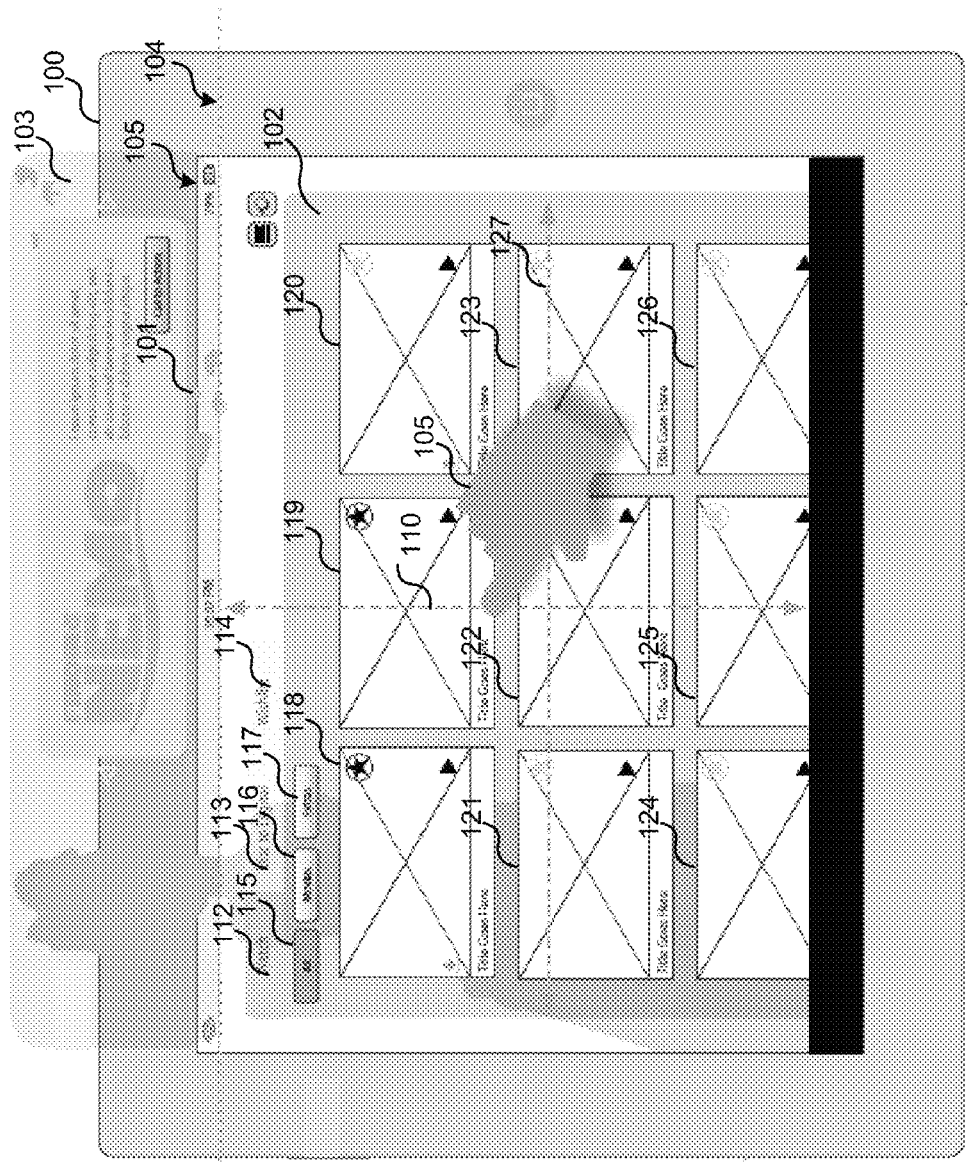
FIG. 1B is a diagram illustrating an example resizable and lockable user interface (UI) for accessing different content, where the second section of the UI in FIG. 1A is resized to be hidden from view, in accordance with one embodiment of the systems and methods described herein.

FIG. 1B is a diagram illustrating an example resizable and lockable user interface (UI) 101 for accessing different content, where the second section 103 of the UI 101 in FIG. 1A is resized to be hidden from view. In the illustrated example, the second section 103 is resized such that it is completely "hidden" (i.e., the area of the second section 103 is zero). The second section 103 is resized from the original size to zero, resulting in a visual effect as if the second section 102 is "hidden" and "locked." That is, the boundary 104 between the first section 102 and the second section 103 is fixed to the top edge 105 of the display area of the visual display 100. As such, no secondary content is displayed and the second section 103 does not move in response to a user's input until the second section 103 is unlocked.

In the illustrated example, only the first section 102 is displayed on the screen space of the electronic visual display 100. In various embodiments, the first section 102 and the primary content displayed in the first section 102 may be adjusted. Compared with FIG. 1A, additional primary content and UI controls 124-126 are displayed in the section 102 in FIG. 1B.

In order to trigger a resizing of the second section 103, a user may slide up both sections until the boundary 104 between the first section 102 and the second section 103 reaches the top edge 105 of the display area of the visual display device 100. A user may swipe up swiftly to fix the boundary 104 to the top edge 105 thereby locking the size of the second section 103 to the temporary size, which is zero in the illustrated example. In one embodiment, a user may draw a line across the display area to define the new position for the boundary 104 and swipe up swiftly, tap the screen swiftly, or employ a multi-finger motion thereby locking the size of the second section 103 to the temporary size.

While a second section 103 is being resized, content displayed in the second section 103 may be adjusted simultaneously according to the instant size of the second section 103. In various embodiments, content may be prioritized such that depending on the area of the second section 103, content with the priority above a threshold priority is displayed. As such, content of the highest priority disappears last in the second section 103 while the second section 103 is being resized. When a second section 103 is resized, primary content displayed in the first section 102 and secondary content displayed in the second section 103 may be both navigated via UI controls and/or traditional navigation elements. When a second section 103 is resized and fixed, only content of the first section 102 may be navigated via UI controls and/or traditional navigation elements.

In the illustrated example, as the second section 103 is resized to be completely "hidden" (i.e., the second section 103 is resized to zero and fixed), no secondary content is displayed in the second section 103. When a user navigates the user interface 101 in FIG. 1B, only the primary content of the first section 102 is visible. The user's scrolling gestures may trigger UI controls 110 and 127 (e.g., up and down, left and right) to allow a user to navigate and or review the primary content while the second section 103 is fixed to be invisible. In some embodiments, the first section 102 may be resized to fit the display area of the visual display 100, and all the primary content may be displayed in the first section 102, which is the display area of the visual display device 100.

In the illustrated examples, the second section 103 is above the first section 102. In other embodiments, a first section and a second section may be configured in other positions relative to each other. For example, the second section 103 may be below, to the right, or to the left of the first section 102. In various embodiments, each of the first section and the second section may comprise a plurality of sub-sections corresponding to different display areas. The secondary display area and the primary display area may be positioned in various arrangements.

Figure 2:
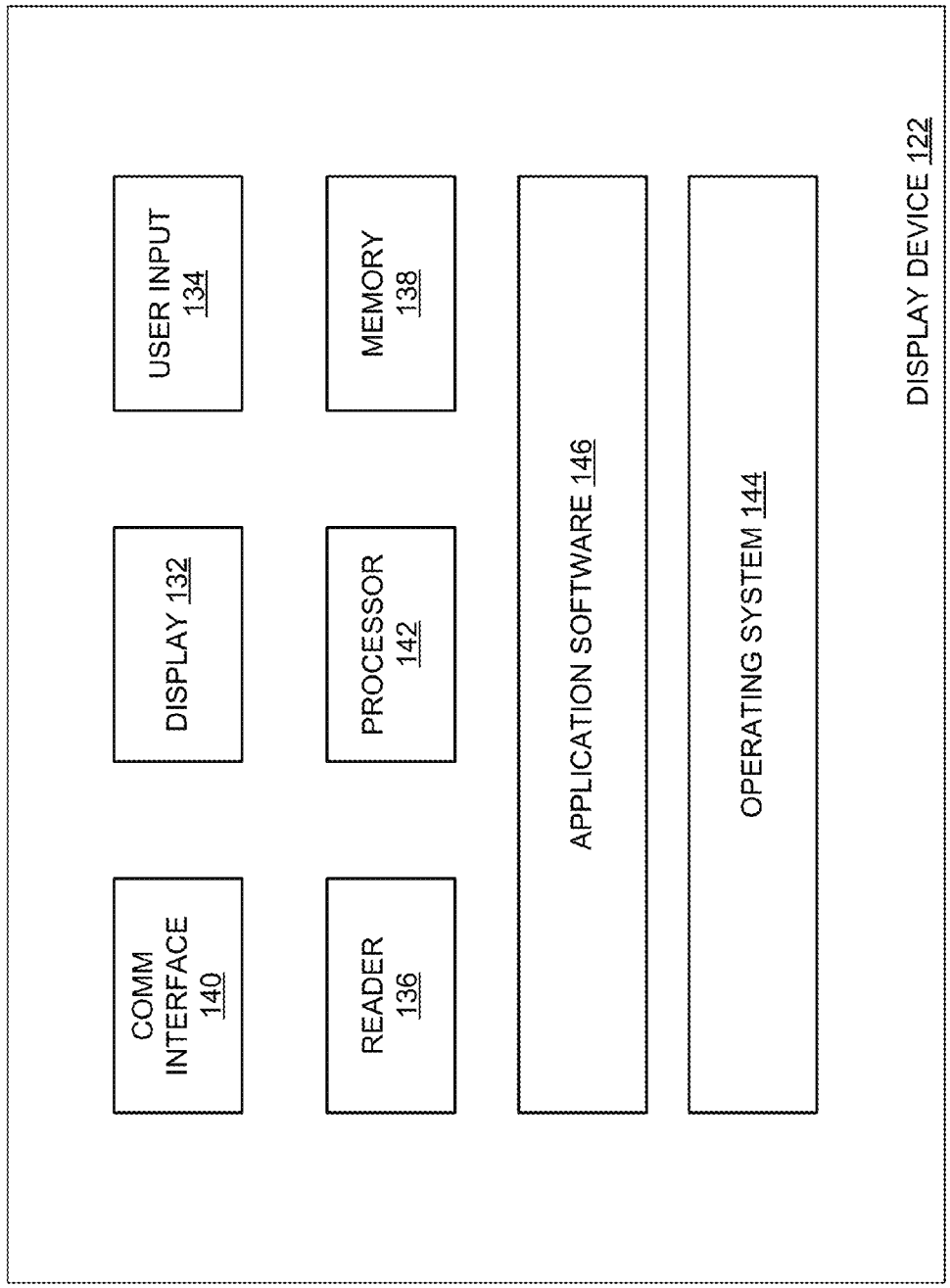
FIG. 2 illustrates a detailed view of one example of an exemplary display device with which the UI of FIGS. 1A and 1B can be used

Turning now to FIG. 2, a detailed view of one example of an exemplary display device 122 (with which the UI of FIGS. 1A and 1B can be used) is provided. The display devices 122 may take various forms, including, for example, iPads®, tablet computers, iPhones®, Kindles®, Android® devices, or other like tablets, smart phones, smart TVs or other computing devices. Accordingly, the display device 122 may include operating system software 144. The operating system software 144 may be a conventional operating system such as Windows®, MacOS®, Linux®, or others; it may be a stripped down version of an operating environment such as a Java Virtual Machine or the like; or it may be a mobile operating system such as the Android® Operating System from Google®, the iOS from Apple®, the Windows Phone® from Microsoft® or other mobile operating system. The operating system software 144 may include software routines that allow for the hosting and execution of one or more application programs or application software 146 such as event applications.

The application software 146 may include software that provides additional functionality to the device. In some embodiments, the application software 146 may include applications to provide browsing and navigation features such as those described herein. As described herein, the application software 146 may be downloaded to the device such as via a communication interface 140 (described below) or it may be preinstalled in memory 138 of the display device 122.

As shown, the example display device 122 includes a display 132. The display 132 may form part of the display device 122, or it may be a separate hardware component that is connected to the display device 122. For example, the display 132 may be a touch screen display, which is part of the iPad® device and/or a smart TV.

The example display device 122 also includes a processor 142 and memory 138. The memory 138 may include volatile memory such as some form of random access memory, and it may include non-volatile memory such as flash memory or a hard disk drive. The processor 142 may be a conventional central processing unit (CPU) such as those manufactured by AMD®, and Intel®, or it may be a specialized processor. The processor 142 may be configured to execute computer instructions from the operating system software 144, application software 146, or other software stored in the memory 138.

The display device 122 may also include a communication interface 140. The communication interface 140 may take the form of a network interface chip or card and its corresponding driver software that allows the display device 122 to communicate with external networks. For example, the communication interface 140 can include communication interfaces to support communication protocols such as Bluetooth®, WiFi® or other wireless or wired protocols. The display device 122 may further include a card reader or other memory device reader 136 capable of reading removable memory cards such as, for example, SD cards, thumb drives and the like.

Figure 3:
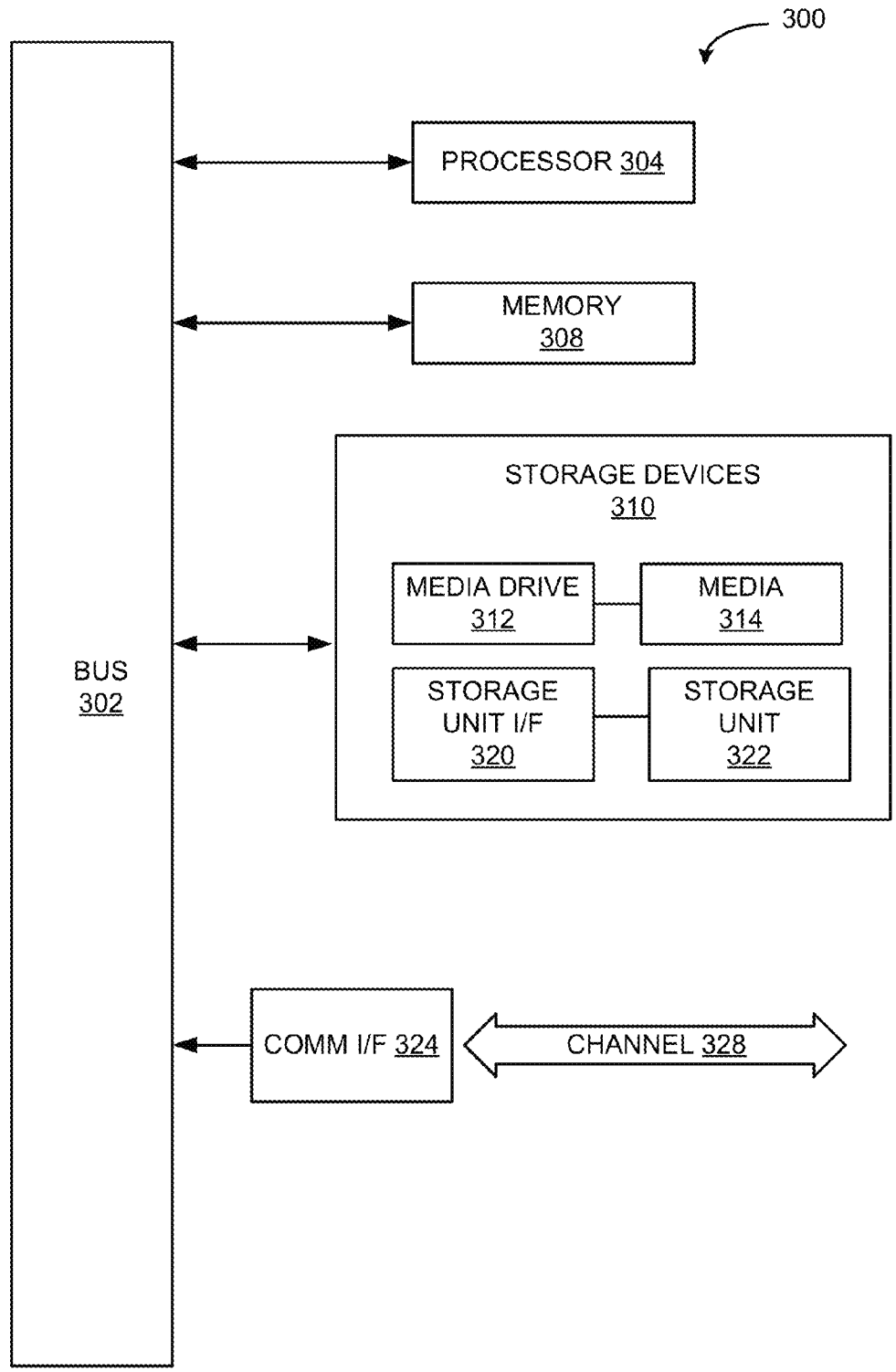
FIG. 3 illustrates an example computing module that may be used to implement various features of the system and methods disclosed herein.

As used herein, the term module might describe a given unit of functionality that can be performed in accordance with one or more embodiments of the present application. As used herein, a module might be implemented utilizing any form of hardware, software, or a combination thereof. For example, one or more processors, controllers, ASICs, PLAs, PALs, CPLDs, FPGAs, logical components, software routines or other mechanisms might be implemented to make up a module. In implementation, the various modules described herein might be implemented as discrete modules or the functions and features described can be shared in part or in total among one or more modules. In other words, as would be apparent to one of ordinary skill in the art after reading this description, the various features and functionality described herein may be implemented in any given application and can be implemented in one or more separate or shared modules in various combinations and permutations. Even though various features or elements of functionality may be individually described or claimed as separate modules, one of ordinary skill in the art will understand that these features and functionality can be shared among one or more common software and hardware elements, and such description shall not require or imply that separate hardware or software components are used to implement such features or functionality.

Where components or modules of the application are implemented in whole or in part using software, in one embodiment, these software elements can be implemented to operate with a computing or processing module capable of carrying out the functionality described with respect thereto. One such example computing module is shown in FIG. 3. Various embodiments are described in terms of this example-computing module 300. After reading this description, it will become apparent to a person skilled in the relevant art how to implement the application using other computing modules or architectures.

Referring now to FIG. 3, computing module 300 may represent, for example, computing or processing capabilities found within desktop, laptop, notebook, and tablet computers; hand-held computing devices (tablets, PDA's, smart phones, cell phones, palmtops, etc.); mainframes, supercomputers, workstations or servers; or any other type of special-purpose or general-purpose computing devices as may be desirable or appropriate for a given application or environment. Computing module 300 might also represent computing capabilities embedded within or otherwise available to a given device. For example, a computing module might be found in other electronic devices such as, for example, digital cameras, navigation systems, cellular telephones, portable computing devices, modems, routers, WAPs, terminals and other electronic devices that might include some form of processing capability.

Computing module 300 might include, for example, one or more processors, controllers, control modules, or other processing devices, such as a processor 304. Processor 304 might be implemented using a general-purpose or special-purpose processing engine such as, for example, a microprocessor, controller, or other control logic. In the illustrated example, processor 304 is connected to a bus 302, although any communication medium can be used to facilitate interaction with other components of computing module 300 or to communicate externally.

Computing module 300 might also include one or more memory modules, simply referred to herein as main memory 308. For example, preferably random access memory (RAM) or other dynamic memory, might be used for storing information and instructions to be executed by processor 304. Main memory 308 might also be used for storing temporary variables or other intermediate information during execution of instructions to be executed by processor 304. Computing module 300 might likewise include a read only memory ("ROM") or other static storage device coupled to bus 302 for storing static information and instructions for processor 304.

The computing module 300 might also include one or more various forms of information storage mechanism 310, which might include, for example, a media drive 312 and a storage unit interface 320. The media drive 312 might include a drive or other mechanism to support fixed or removable storage media 314. For example, a hard disk drive, a floppy disk drive, a magnetic tape drive, an optical disk drive, a CD or DVD drive (R or RW), or other removable or fixed media drive might be provided. Accordingly, storage media 314 might include, for example, a hard disk, a floppy disk, magnetic tape, cartridge, optical disk, a CD or DVD, or other fixed or removable medium that is read by, written to or accessed by media drive 312. As these examples illustrate, the storage media 314 can include a computer usable storage medium having stored therein computer software or data.

In alternative embodiments, information storage mechanism 310 might include other similar instrumentalities for allowing computer programs or other instructions or data to be loaded into computing module 300. Such instrumentalities might include, for example, a fixed or removable storage unit 322 and an interface 320. Examples of such storage units 322 and interfaces 320 can include a program cartridge and cartridge interface, a removable memory (for example, a flash memory or other removable memory module) and memory slot, a PCMCIA slot and card, and other fixed or removable storage units 322 and interfaces 320 that allow software and data to be transferred from the storage unit 322 to computing module 300.

Computing module 300 might also include a communications interface 324. Communications interface 324 might be used to allow software and data to be transferred between computing module 300 and external devices. Examples of communications interface 324 might include a modem or softmodem, a network interface (such as an Ethernet, network interface card, WiMedia, IEEE 802.XX or other interface), a communications port (such as for example, a USB port, IR port, RS232 port Bluetooth® interface, or other port), or other communications interface. Software and data transferred via communications interface 324 might typically be carried on signals, which can be electronic, electromagnetic (which includes optical) or other signals capable of being exchanged by a given communications interface 324. These signals might be provided to communications interface 324 via a channel 328. This channel 328 might carry signals and might be implemented using a wired or wireless communication medium. Some examples of a channel might include a phone line, a cellular link, an RF link, an optical link, a network interface, a local or wide area network, and other wired or wireless communications channels.

In this document, the terms "computer program medium" and "computer usable medium" are used to generally refer to transitory or non-transitory media such as, for example, memory 308, storage unit 320, media 314, and channel 328. These and other various forms of computer program media or computer usable media may be involved in carrying one or more sequences of one or more instructions to a processing device for execution. Such instructions embodied on the medium, are generally referred to as "computer program code" or a "computer program product" (which may be grouped in the form of computer programs or other groupings). When executed, such instructions might enable the computing module 300 to perform features or functions of the present application as discussed herein.

Although described above in terms of various exemplary embodiments and implementations, it should be understood that the various features, aspects and functionality described in one or more of the individual embodiments are not limited in their applicability to the particular embodiment with which they are described, but instead can be applied, alone or in various combinations, to one or more of the other embodiments of the application, whether or not such embodiments are described and whether or not such features are presented as being a part of a described embodiment.

Thus, the breadth and scope of the present application should not be limited by any of the above-described exemplary embodiments.

Terms and phrases used in this document, and variations thereof, unless otherwise expressly stated, should be construed as open ended as opposed to limiting. As examples of the foregoing: the term "including" should be read as meaning "including, without limitation" or the like; the term "example" is used to provide exemplary instances of the item in discussion, not an exhaustive or limiting list thereof; the terms "a" or "an" should be read as meaning "at least one," "one or more" or the like; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, where this document refers to technologies that would be apparent or known to one of ordinary skill in the art, such technologies encompass those apparent or known to the skilled artisan now or at any time in the future.

The presence of broadening words and phrases such as "one or more," "at least," "but not limited to" or other like phrases in some instances shall not be read to mean that the narrower case is intended or required in instances where such broadening phrases may be absent. The use of the term "module" does not imply that the components or functionality described or claimed as part of the module are all configured in a common package. Indeed, any or all of the various components of a module, whether control logic or other components, can be combined in a single package or separately maintained and can further be distributed in multiple groupings or packages or across multiple locations.

Additionally, the various embodiments set forth herein are described in terms of exemplary block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

The invention claimed is:
1. A system, comprising:
    a touchscreen display comprising a display area;
    a processor;
    a non-transitory computer-readable medium operatively coupled to the processor and having instructions stored thereon that, when executed by the processor, causes the system to:
    simultaneously display on the display area of the touchscreen display:
        a first section displaying a first content, wherein the displayed first section comprises a plurality of selectable user interface controls for accessing the first content; and
        a second section displaying a second content, the second section having an original size, wherein the displayed second section comprises a selectable user interface control for accessing the second content, wherein the plurality of selectable user interface controls of the displayed first section are independent from the selectable user interface control of the displayed second section such that the first content and the second content are accessed independently, and wherein a boundary separates the first section and the second section;
receive data generated by a user by swiping the display area of the touchscreen display in a direction, wherein the data represents a swipe user interface gesture;
in response to receiving the data, slide the displayed first section and the displayed second section in the direction of the swipe, and fixing the second section to edge of the display area of the touchscreen display such that the second section is hidden from display and locked from returning to the display, and wherein the fixed second section is unresponsive to any user input that is not an unlocking motion or gesture.

2. The system of claim 1, wherein the first content and the second content are navigated independent of each other.

3. The system of claim 1, wherein the second content displayed in the second section is adjusted according to the second size of the second section.

4. The system of claim 1, wherein, after sliding the displayed first section and the displayed second section in the direction of the swipe, the new location of the boundary separating the first section and the second section is an edge of the display area of the touchscreen display such that the second section is hidden from the display area and locked from user input.

5. The system of claim 4, wherein the first section is automatically resized to fit all of the display area when the second section is hidden from the display area.

6. The system of claim 5, wherein the instructions, when executed by the processor, further cause the system to: receive second data generated by a user by swiping an area of the touchscreen display that lacks content, wherein the second data represents a second swipe user interface gesture; and in response to receiving the second data: unlock and display the second section on the display area; and resize the first section.

7. The system of claim 1, wherein the displayed second section comprises a plurality of user interface controls for accessing the second content.

8. The system of claim 1, wherein the second content comprises a promotional banner.

9. A system, comprising:
a non-transitory computer-readable medium operatively coupled to a processor and having instructions stored thereon that, when executed by the processor, causes the system to:
simultaneously display on a display area of a touchscreen display:
a first section displaying a first content, wherein the displayed first section comprises a plurality of selectable user interface controls for traversing the first content; and
a second section displaying a second content, wherein the displayed second section comprises a selectable user interface control for traversing the second content, and the plurality of selectable user interface controls of the displayed first section are independent from the selectable user interface control of the displayed second section such that the first content and the second content are traversed independently;
wherein a boundary separates the first section and the second section;
receive data generated by a user by swiping the display area of the touchscreen display in a direction; and
in response to the received data, slide the displayed first section and the displayed second section in the direction of the swipe, and fixing the second section to an edge of the display area of the touchscreen display such that the second section is hidden from display and locked from returning to the display, and wherein the fixed second section is unresponsive to any user input that is not an unlocking motion or gesture.

10. The system of claim 9, wherein the second content comprises a promotional banner.

11. A user interface method for browsing information on a display, comprising:
simultaneously displaying on a display area of a touchscreen display:
a first section displaying a first content, wherein the displayed first section comprises a plurality of selectable user interface controls for accessing the first content; and
a second section displaying a second content having an original size, wherein the displayed second section comprises a selectable user interface control for accessing the second content, wherein the plurality of selectable user interface controls of the displayed first section are independent from the selectable user interface control of the displayed second section such that the first content and the second content are accessed independently, and wherein a boundary separates the first section and the second section;
receiving data generated by a user by swiping the display area of the touchscreen display in a direction, wherein the data represents a swipe user interface gesture;
in response to receiving the data, slide the displayed first section and the displayed second section in the direction of the swipe, and fixing the second section to edge of the display area of the touchscreen display such that the second section is hidden from display and locked from returning to the display, and wherein the fixed second section is unresponsive to any user input that is not an unlocking motion or gesture.

12. The user interface method of claim 11, wherein the first content and the second content are navigated independent of each other.

13. The user interface method of claim 11, further comprising adjusting the second content displayed in the second section according to the second size of the second section.

14. The user interface method of claim 11, wherein after sliding the displayed first section and the displayed second section in the direction of the swipe, the new location of the boundary separating the first section and the second section is an edge of the display area of the touchscreen display such that the second section is hidden from the display area and locked from user input.

15. The user interface method of claim 14, wherein the first section is automatically resized to fit all of the display area when the second section is hidden from the display area.

16. The user interface method of claim 15, further comprising: receiving second data generated by a user by swiping an area of the touchscreen display that lacks content, wherein the second data represents a second swipe user interface gesture; and in response to receiving the second data: unlocking and displaying the second section on the display area; and resizing the first section.

17. The user interface method of claim 11, wherein the second section comprises a set of user interface controls for accessing the second content.

18. The user interface method of claim 11, wherein the second content comprises a promotional banner.

* * * * *